(12) United States Patent
Zhang et al.

(10) Patent No.: US 11,885,978 B2
(45) Date of Patent: Jan. 30, 2024

(54) MICRO-LENS STRUCTURE, DISPLAYING DEVICE, AND MACHINING METHOD OF MICRO-LENS STRUCTURE

(71) Applicant: BOE Technology Group Co., Ltd., Beijing (CN)

(72) Inventors: Feng Zhang, Beijing (CN); Kang Guo, Beijing (CN); Renquan Gu, Beijing (CN); Detian Meng, Beijing (CN); Libo Wang, Beijing (CN); Dongfei Hou, Beijing (CN); Guangcai Yuan, Beijing (CN); Xue Dong, Beijing (CN); Wei Wang, Beijing (CN); Jinye Zhu, Beijing (CN); Jing Yu, Beijing (CN); Jing Liu, Beijing (CN); Haitao Huang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 375 days.

(21) Appl. No.: 17/348,677

(22) Filed: Jun. 15, 2021

(65) Prior Publication Data
US 2022/0163699 A1    May 26, 2022

(30) Foreign Application Priority Data
Nov. 24, 2020    (CN) .......................... 202011332289.9

(51) Int. Cl.
| | |
|---|---|
| *G02B 3/00* | (2006.01) |
| *B29D 11/00* | (2006.01) |
| *G02B 27/09* | (2006.01) |
| *G02B 27/01* | (2006.01) |

(52) U.S. Cl.
CPC ...... *G02B 3/0043* (2013.01); *B29D 11/00298* (2013.01); *G02B 3/0056* (2013.01); *G02B 27/0172* (2013.01); *G02B 27/0961* (2013.01)

(58) Field of Classification Search
CPC .. G02B 3/0043; G02B 3/0012; G02B 3/0056; G02B 27/0961; B29D 11/00298
See application file for complete search history.

(56) References Cited

U.S. PATENT DOCUMENTS

| | | |
|---|---|---|
| 2005/0018306 A1 | 1/2005 | Yoshida et al. |
| 2009/0284683 A1 | 11/2009 | Usukura et al. |
| 2012/0313552 A1 | 12/2012 | Chang et al. |
| 2017/0144468 A1 | 5/2017 | Kaizuka |

FOREIGN PATENT DOCUMENTS

| | | |
|---|---|---|
| CN | 1599882 A | 3/2005 |
| CN | 102832227 A | 12/2012 |
| CN | 106660383 A | 5/2017 |
| CN | 210576029 U | 5/2020 |
| CN | 111929977 A | 11/2020 |
| IN | 101517462 A | 8/2009 |
| JP | 2010243574 A | 10/2010 |
| JP | 2011242419 A | 12/2011 |
| JP | 2012252871 A | 12/2012 |
| KR | 20060059103 A | 6/2006 |

OTHER PUBLICATIONS

CN 202011332289.9 first office action.

*Primary Examiner* — Ryan D Howard
(74) *Attorney, Agent, or Firm* — IPro, PLLC (57) ABSTRACT

Disclosed are a micro-lens structure, a displaying device, and a machining method of the micro-lens structure. The micro-lens structure specifically comprises: micro-lens units distributed in an array, wherein each micro-lens unit comprises at least two micro-lenses made of a photoresist, and the at least two micro-lenses have different arch heights.

13 Claims, 6 Drawing Sheets

Machine, by exposure and development, a photoresist into photoresist units distributed in an array, wherein each photoresist unit comprises at least two first micro-lenses ~ 201

Heat the first micro-lenses to form second micro-lenses by reflex of the first micro-lenses, wherein an arch height of the second micro-lenses is greater than a height of the first micro-lenses ~ 202

Cool the second micro-lenses to obtain a micro-lens structure ~ 203

MICRO-LENS STRUCTURE, DISPLAYING DEVICE, AND MACHINING METHOD OF MICRO-LENS STRUCTURE

CROSS REFERENCE TO RELEVANT APPLICATIONS

The disclosure claims priority to Chinese Patent Application No. 202011332289.9, entitled "MICRO-LENS STRUCTURE, DISPLAYING DEVICE, AND MACHINING METHOD OF MICRO-LENS STRUCTURE", filed with the China National Intellectual Property Administration on Nov. 24, 2020, which is incorporated herein by reference in its entirety.

TECHNICAL FIELD

The disclosure relates to the technical field of display, in particular to a micro-lens structure, a displaying device, and a machining method of the micro-lens structure.

BACKGROUND

Micro-lens structures are continuous or discrete micro-lens units prepared on devices or transparent substrates to refract or focus light, and are applied to various optical devices, such as naked-eye displaying devices, augmented reality (AR), virtual reality (VR), sensors and optical functional films.

Existing displaying devices generally adopt the light field display technique to realize a naked-eye 3D display effect. Specifically, a micro-lens structure is disposed on the surface of the displaying device, wherein micro-lens units may be liquid crystal micro-lens units or electrostrictive micro-lens units, and different voltages are applied to the micro-lens units to realize different focal lengths to fulfill light field display.

SUMMARY

The embodiments of the disclosure provide a micro-lens structure, a displaying device, and a machining method of the micro-lens structure.

In the first aspect, the embodiment of the disclosure provides a micro-lens structure, comprising: micro-lens units distributed in an array, wherein each said micro-lens unit comprises at least two micro-lenses made of a photoresist; and the at least two micro-lenses have different arch heights.

Optionally, the micro-lens units are distributed in an array in a first direction; and the at least two micro-lenses in each said micro-lens unit are alternately arranged in the first direction.

Optionally, the micro-lenses comprise at least one of a cylindrical micro-lens and a spherical micro-lens.

Optionally, the micro-lens unit comprises: at least one said cylindrical micro-lens and multiple said spherical micro-lenses;

a lengthwise direction of the cylindrical micro-lens is a second direction that is perpendicular to the first direction; and in the second direction, the multiple spherical micro-lenses are sequentially arranged in a spaced manner.

Optionally, the micro-lens unit comprises: one said cylindrical micro-lens and one said spherical micro-lens; and in the first direction, a width of the cylindrical micro-lens is equal to that of the spherical micro-lens.

Optionally, the micro-lens unit comprises multiple micro-lenses, and the multiple micro-lenses comprise: at least two said cylindrical micro-lenses and/or at least two said spherical micro-lenses; and in the first direction, widths of the at least two cylindrical micro-lenses are different, and widths of the at least two spherical micro-lenses are different.

Optionally, in case where the micro-lens unit comprises multiple said cylindrical micro-lenses or multiple said spherical micro-lenses, widths of the multiple cylindrical micro-lenses are multiples of one another, and widths of the multiple spherical micro-lenses are multiples of one another.

Optionally, further comprising a refractive index matching layer that covers the micro-lenses.

Optionally, the refractive index matching layer is made of resin, and a refractive index of the refractive index matching layer matches a refractive index of the micro-lenses.

Optionally, the refractive index of the refractive index matching layer is greater than the refractive index of the micro-lenses; or the refractive index of the refractive index matching layer is smaller than the refractive index of the micro-lenses.

Optionally, the first direction is a lengthwise direction or a widthwise direction of the micro-lens structure.

In the second aspect, the embodiment of the disclosure provides a displaying device, comprising: an electronic device and the above micro-lens structure, wherein the micro-lens structure is connected to the electronic device.

Optionally, the micro-lens structure is formed on the electronic device.

Optionally, the electronic device comprises at least one of a display component and a sensor.

Optionally, the micro-lens units are distributed in an array in a first direction, and the first direction is the same as a distribution direction of a pixel array of the displaying device.

In the third aspect, the embodiment of the disclosure provides a machining method of a micro-lens structure, being used for machining the above micro-lens structure, and comprising:

machining, by exposure and development, a photoresist into photoresist units distributed in an array, wherein each said photoresist unit comprises at least two first micro-lenses;

heating the first micro-lenses to form second micro-lenses by reflex of the first micro-lenses, wherein an arch height of the second micro-lenses is greater than a height of the first micro-lenses; and cooling the second micro-lenses to obtain the micro-lens structure.

The aforesaid description is merely a brief summary of the technical solution of the disclosure. To allow those skilled in the art to gain a better understanding of the technical means of the disclosure so as to implement the disclosure according to the contents in the specification and to make the above and other purposes, features and advantages of the disclosure clearer, specific implementations of the disclosure are given below.

BRIEF DESCRIPTION OF THE DRAWINGS

To more clearly explain the technical solutions of the embodiments of the disclosure or related arts, drawings required for describing the embodiments of the disclosure or the related arts will be briefly introduced below. Obviously, the drawings in the following description only illustrate some embodiments of the invention, and those ordinarily skilled in the art can obtain other drawings according to the following ones without creative labor.

DETAILED DESCRIPTION

To gain a better understanding of the above purposes, features and advantages of the disclosure, the disclosure will be described in further detail below in conjunction with the accompanying drawings and specific implementations. Obviously, the embodiments in the following description are merely illustrative ones, and are not all possible ones of the disclosure. All other embodiments obtained by those ordinarily skilled in the art based on the following ones without creative labor should also fall within the protection scope of the disclosure.

The embodiments of the disclosure provide a micro-lens structure which is applied to optical devices such as naked-eye 3D displaying devices, AR, VR, sensors and optical functional films. In the embodiments of the invention, the micro-lens structure applied to a 3D displaying device is described by way of example, and the micro-lens structure may also be applied to other scenarios with reference to the following description.

Figure 1:
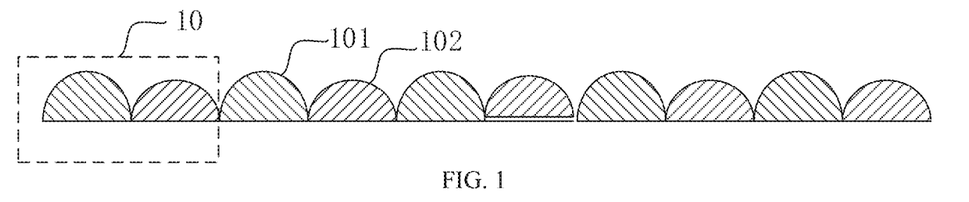
FIG. 1 is a structural diagram of a micro-lens structure according to one embodiment of the disclosure.
Figure 2:
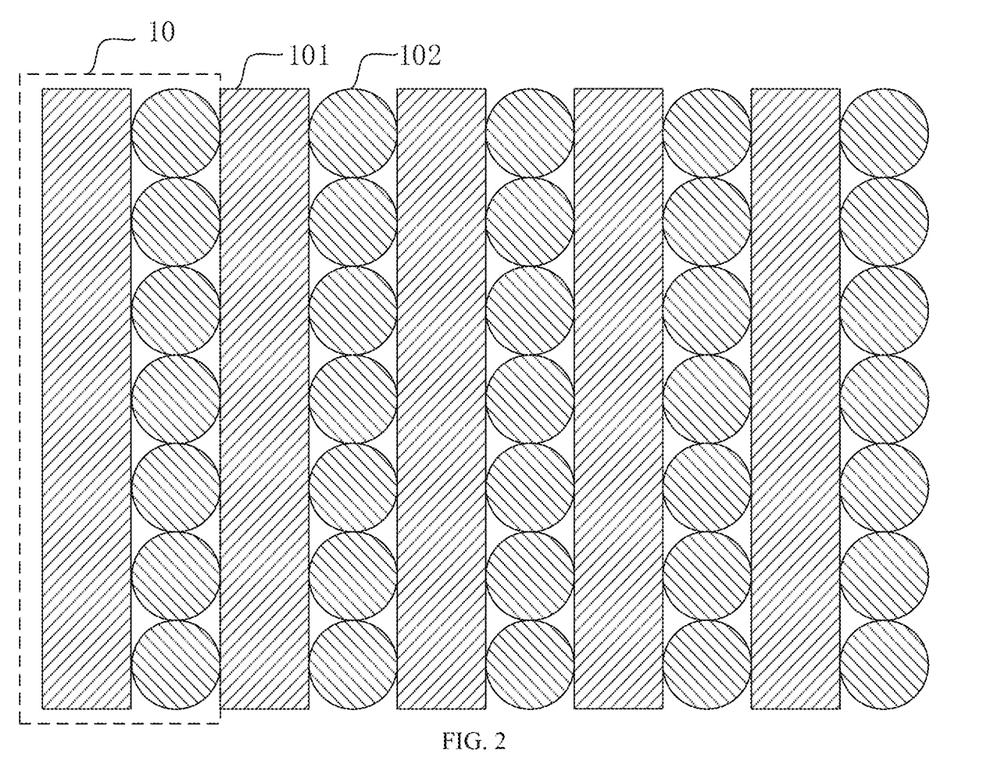
FIG. 2 is a structural diagram of the micro-lens structure shown in FIG. 1 from another perspective.
Figure 3:
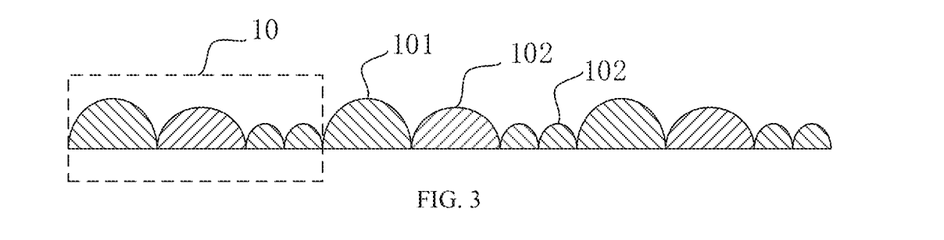
FIG. 3 is a structural diagram of a micro-lens structure according to another embodiment of the disclosure.
Figure 4:
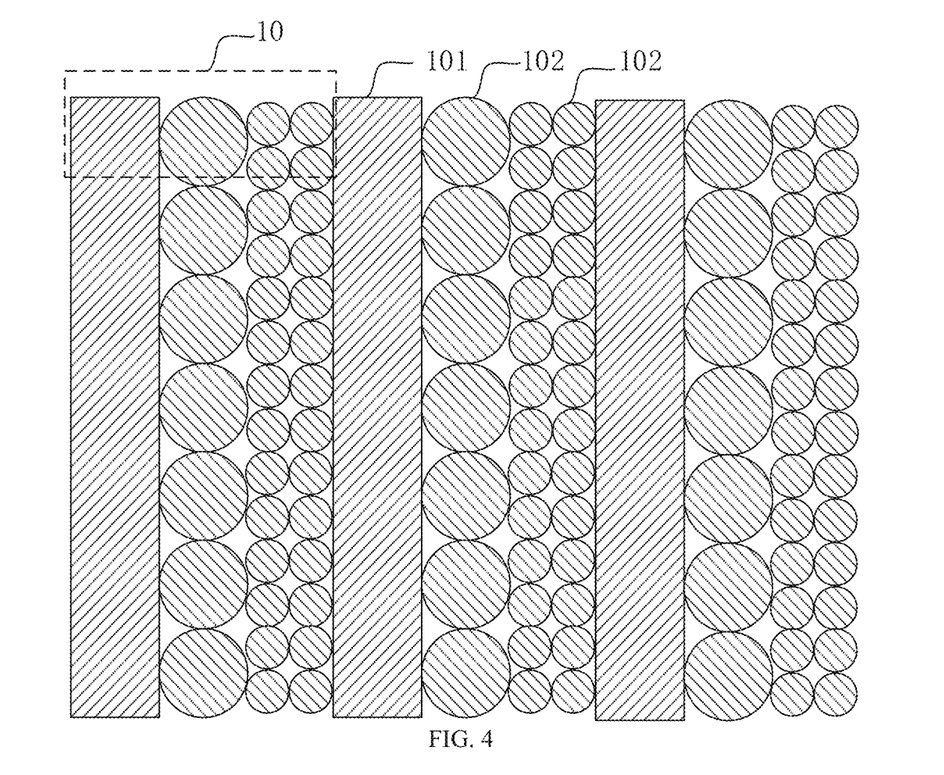
FIG. 4 is a structural diagram of the micro-lens structure shown in FIG. 3 from another perspective.

Please refer to FIG. 1 which is structural diagram of a micro-lens structure according to one embodiment of the disclosure, FIG. 2 which is a structural diagram of the micro-lens structure shown in FIG. 1 from another perspective, FIG. 3 which is a structural diagram of a micro-lens structure according to another embodiment of the disclosure, and FIG. 4 which is a structural diagram of the micro-lens structure shown in FIG. 3 from another perspective. The micro-lens structure may specifically comprise: micro-lens units 10 distributed in an array, wherein each micro-lens unit 10 may comprise at least two micro-lenses made of a photoresist, and the at least two micro-lenses have different arch heights.

In the embodiments of the disclosure, the micro-lens structure may comprise micro-lens units 10 distributed in an array, each micro-lens unit 10 may comprise at least two micro-lenses, and the at least two micro-lenses have different arch heights, so that the curvature radiuses and focal lengths of the at least two micro-lenses are also different. That is, each micro-lens unit 10 may comprise at least two micro-lenses with different focal lengths, so that the micro-lens structure is able to fulfill light field display to realize a naked-eye 3D display effect. In this way, an adjustment of the focal lengths of the micro-lenses by means of the application of different voltages to the micro-lenses is avoided, the power consumption is low, the structure is simple, and the micro-lens structure may be designed to be light and thin; in addition, the interference is low, and the display effect is stable. In actual application, when the micro-lens structure is applied to a displaying device, the micro-lenses may be prepared on an electronic device of the displaying device by lithographic thermal reflux, and the micro-lens structure may be integrated in the displaying device to realize a light and thin design of the displaying device.

In actual application, the micro-lens structure may be prepared by an imprinting method or a lithographic thermal reflux method. When the imprinting method is used to prepare micro-lenses with different arch heights, different imprinting parameters are needed because of the different heights of the micro-lenses, so the process for preparing the micro-lens structure through the imprinting method is complicated. When the lithographic thermal reflux method is used to prepare the micro-lens structure, exposed and developed patterns are heated to melt the photoresist to form the micro-lenses, so the process is simple; besides, lithographic-level alignment of the micro-lenses and the displaying device may be realized by lithographic thermal reflux to enable the micro-lens structure to be better integrated in the displaying device to realize the light and thin design of the displaying device.

Specifically, in case where the micro-lens structure is applied to the displaying device, because the pixel design of the displaying device is constant and the width (aperture) of the micro-lenses in the micro-lens structure is also constant, the focal lengths of the micro-lenses depend on the arch heights of the micro-lenses. In the embodiments of the disclosure, the arch heights of the at least two micro-lenses are different, so the curvature radiuses and focal lengths of the at least to micro-lenses are also different. That is, each micro-lens unit 10 may comprise at least two micro-lenses with different focal lengths, so that the micro-lens structure is able to fulfill light field display to realize a naked-eye 3D display effect.

In some optional embodiments of the disclosure, the micro-lens units 10 may be distributed in an array in a first direction; in each micro-lens unit 10, the at least two micro-lenses may be alternately arranged in the first direction, and the micro-lenses comprise at least one of a cylindrical micro-lens and a spherical micro-lens.

Specifically, the first direction may be a lengthwise direction or a widthwise direction of the micro-lens structure, and the embodiments of the disclosure have no limitation in this aspect. In case where the micro-lenses are applied to the displaying device, the first direction may be the same as the distribution direction of a pixel array of the displaying device.

In actual application, because the array direction of the micro-lens units 10 is the same as the alternate arrangement direction of the at least two micro-lenses in each micro-lens unit 10, the relative positions of the micro-lens units 10 of the micro-lens structure and the relative positions of the at least two micro-lenses in each micro-lens unit 10 may be cross-referenced to improve the machining precision of the micro-lens structure.

Specifically, the micro-lenses comprise at least one of a cylindrical micro-lens 101 and a spherical micro-lens 102. The cylindrical micro-lens 101 is cylindrical, and the spherical micro-lens 102 is spherical. The cylindrical micro-lens 101 may cover one row (multiple rows) or one column (multiple columns) of pixels, the spherical micro-lens 102 may cover one or more pixels, and the embodiments of the disclosure have not limitation in this aspect.

It should be noted that FIG. 1 and FIG. 4 only illustrates the case where the micro-lens units 10 comprise both the cylindrical micro-lenses 101 and the spherical micro-lenses 102. But, in actual application, the micro-lens units 10 may only comprise the cylindrical micro-lenses 101 or the spherical micro-lenses 102, and the embodiments of the disclosure have not limitation in this aspect.

Figure 5:
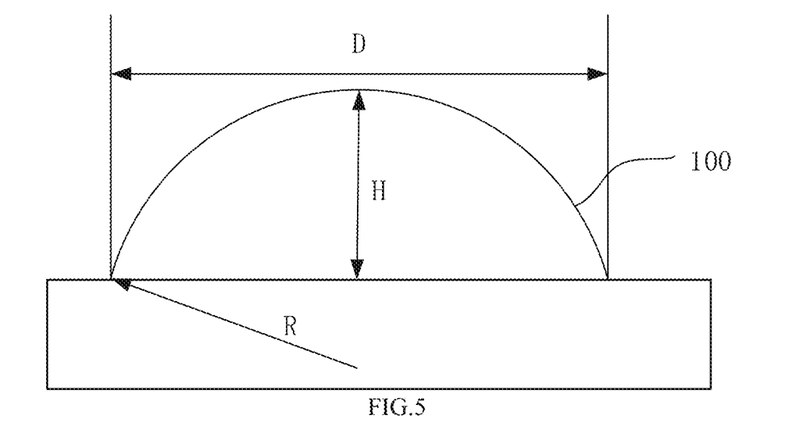
FIG. 5 is a structural diagram of a micro-lens according to one embodiment of the disclosure.
Figure 6:
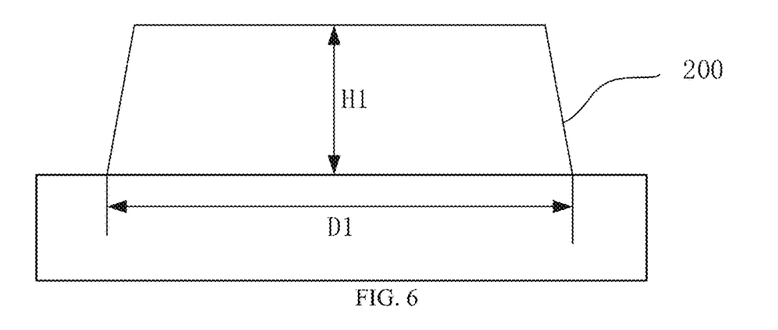
FIG. 6 is a structural diagram of the micro-lens shown in FIG. 5 before thermal reflux.

Please refer to FIG. 5 which is a structural diagram of a micro-lens according to one embodiment of the disclosure and FIG. 6 which is a structural diagram of the micro-lens in FIG. 5 before thermal reflux. In actual application, FIG. 6 illustrates a first micro-lens 200 formed by a photoresist through exposure and development before thermal reflux, and a micro-lens 100 shown in FIG. 5 is formed by heating and cooling the first micro-lens 200 shown in FIG. 6.

Specifically, after the first lens 200 shown in FIG. 6 is heated and cooled, the width D1 of the first micro-lens 200 in the first direction becomes the width D of the micro-lens 100, and the height H1 of the first micro-lens 200 becomes the arch height H of the micro-lens 100. Micro-lenses 100 in different shapes will be formed by first micro-lenses 200 in different shapes after thermal reflux. Specifically, if the first micro-lens 100 is in a cone shape, the micro-lens 102 will be formed after thermal reflux; or, if the first micro-lens 100 is in a trapezoidal cylinder shape, the cylinder micro-lens 101 will be formed after thermal reflux.

In actual application, the size of the micro-lens 100 in FIG. 5 should be equal to the size of the first micro-lens 200 in FIG. 6 under the condition that the residual film rate is not considered. Thus, under the condition of equal heights H1, micro-lenses formed by first micro-lenses 200 of different widths D1 or shapes after thermal reflux will have different arch heights. So, the shape, width D and arch height H of the micro-lens 100 finally formed by the first micro-lens 200 with a constant height H1 may be set by designing the shape, width D1 and height H of the first micro-lens 200.

In actual application, the curvature radius R of the micro-lens 100 is calculated according to the following formula:

$$R = \frac{D^2 + 4H^2}{8H} \quad (1)$$

In actual application, the widths D of all micro-lenses 100 in the same micro-lens structure are generally identical. So, the curvature radius R of the micro-lens 100 generally depends on the arch height H of the micro-lens 100.

The focal length f of the micro-lens 100 is calculated according to the following formula:

$$f = \frac{R}{n-1} \quad (2)$$

Wherein, n is the refractive index of the micro-lens 100, and micro-lenses 100 made of the same photoresist typically have the same refractive index. As can be seen from formula (2), under the condition that the refractive index n is constant, the focal length f of the micro-lens 100 depends on the curvature radius, which in turn depends on the arch height H of the micro-lens 100, so the focal length of the micro-lens 100 eventually depends on the arch height H.

In some optional embodiments of the disclosure, the at least two micro-lenses may comprise: at least one cylindrical micro-lens 101 and multiple spherical micro-lenses 102, wherein the arch height of the cylindrical micro-lens 101 is different from that of the spherical micro-lenses 102. In actual application, the micro-lens unit 10 may comprises both the cylindrical micro-lens 101 and the spherical micro-lens 102, so that the arch heights of the micro-lenses in the same micro-lens unit 10 may be different to obtain different focal lengths of the micro-lenses.

In the embodiments of the disclosure, a lengthwise direction of the cylindrical micro-lens 101 may a second direction that is perpendicular to the first direction; and in the second direction, the multiple spherical micro-lenses 102 are sequentially arranged in a spaced manner, so that the cylindrical micro-lens 101 and the spherical micro-lenses 102 are alternately arranged in the first direction.

Illustratively, under the precondition that the first direction is the lengthwise direction of the micro-lens structure, the second direction may be the widthwise direction of the micro-lens structure; or, under the precondition that the first direction is the widthwise direction of the micro-lens structure, the second direction may be the lengthwise direction of the micro-lens structure.

As shown in FIG. 1 and FIG. 2, the micro-lens unit 10 may comprise: a cylindrical micro-lens 101 and a spherical micro-lens 102, wherein in the first direction, the width of the cylindrical micro-lens 101 is equal to that the spherical micro-lens 102.

Specifically, in case where the micro-lens structure is applied to the displaying device, because the pixel design of the displaying device is constant and the width of the micro-lenses in the micro-lens structure is also constant, if the micro-lens unit 10 comprises a cylindrical micro-lens 101 and a spherical micro-lens 102, the width of the cylindrical micro-lens 101 may be equal to that of the spherical micro-lens 102.

In actual application, in the process of forming the cylindrical micro-lens 101 and the spherical micro-lens 102 by thermal reflux, micro-lenses with different arch heights may be obtained by means of first micro-lenses 200 of the same width and different shapes. Thus, under the condition that the height of the first micro-lenses 200 is constant, the cylindrical micro-lens 101 and the spherical micro-lens 102 with different arch heights H may be formed by first micro-lenses 200 of different shapes.

Specifically, in case where the micro-lens unit 10 comprises a cylindrical micro-lens 101 and a spherical micro-lens 102, the arch height of the cylindrical micro-lens 101 and the arch height of the spherical micro-lens 102 are different, so the focal length of the cylindrical micro-lens 101 and the focal length of the spherical micro-lens 102 are also different.

In some embodiments of the disclosure, the micro-lens unit 10 comprises multiple micro-lenses, and the multiple micro-lenses may comprise: at least two cylindrical micro-lenses 101 and/or at least two spherical micro-lenses 102. In the first direction, the widths of the at least two cylindrical micro-lenses 101 are different, and the widths of the at least two spherical micro-lenses 102 are different.

In actual application, in the process of machining the cylindrical micro-lenses 101 or the spherical micro-lenses 102 by thermal reflux, micro-lenses with different arch heights may be obtained by means of first micro-lenses 200 of the same shape and different widths. Thus, under the condition that the height of the first micro-lenses 200 is constant, multiple cylindrical micro-lenses 101 with different arch heights H or multiple spherical micro-lenses 102 with different arch heights may be formed by first micro-lenses 200 of different widths. The machining method is simple.

Optionally, in case where the micro-lens unit 10 comprises multiple cylindrical micro-lenses 101 or multiple spherical micro-lenses 102, the widths of the multiple cylindrical micro-lenses 101 are multiples of one another, and the widths of the multiple spherical micro-lenses 102 are multiples of one another correspondingly, so that the multiple cylindrical micro-lenses 101 or the multiple spherical micro-lenses 102 is able to adapt to pixel units in the displaying device.

For example, in case where the micro-lens unit 10 comprises two cylindrical micro-lenses 101, the width of one cylindrical micro-lens 101 may be twice, three times, five times, or other times that of the other cylindrical micro-lens 101. Similarly, in case where the micro-lens unit 10 comprises two spherical micro-lenses 102, the width of one spherical micro-lens 102 may be twice, three times, five times, or other times that of the other spherical micro-lens 102.

For another example, as shown in FIG. 3 and FIG. 4, the micro-lens unit 10 may comprise a cylindrical micro-lens 101 and two spherical micro-lenses 102, wherein the width of the cylindrical micro-lens 101 is equal to that of one spherical micro-lens 102, and the widths of the two spherical micro-lenses 102 are different. Specifically, in FIG. 3 and FIG. 4, the widths of the three micro-lenses from left to right in each micro-lens unit 10 are represented by D2, D3 and D4 respectively, and the focal lengths of these three micro-lenses are represented by f2, f3 and f4 respectively, wherein D2=D3>D4, and f2>f3>f4.

In some optional embodiments of the disclosure, the micro-lens structure further comprises: a refractive index matching layer 11 that covers the micro-lenses. The refractive index matching layer 11 may be made of organic resin, and the refractive index of the refractive index matching layer 11 matches the refractive index of the micro-lenses. Specifically, the refractive index of the refractive index matching layer 11 or greater than the refractive index of the micro-lenses or the refractive index of the refractive index matching layer 11 is smaller than the refractive index of the micro-lenses to ensure that the micro-lens structure has a good light condensing effect.

To sum up, the micro-lens structure provided by the embodiments of the disclosure at least has the following advantages:

In the embodiments of the disclosure, the micro-lens structure may comprise micro-lens units distributed in an array, each micro-lens unit may comprise at least two micro-lenses, and the arch heights of the at least two micro-lenses are different, so that the curvature radiuses and focal lengths of the at least two micro-lenses are also different. That is, each micro-lens unit may comprise at least two micro-lenses with different focal lengths, so that the micro-lens structure is able to fulfill light field display to realize a naked-eye 3D display effect. In this way, an adjustment of the focal lengths of the micro-lenses by means of the application of different voltages to the micro-lenses is avoided, the power consumption is low, the structure is simple, and the micro-lens structure may be designed to be thin and light; in addition, the interference is low, and the display effect is stable. In actual application, in case where the micro-lens structure is applied to a displaying device, the micro-lenses may be prepared on an electronic device of the displaying device by lithographic thermal reflux, and the micro-lens structure may be integrated in the displaying device to realize a light and thin design of the displaying device.

Figure 7:
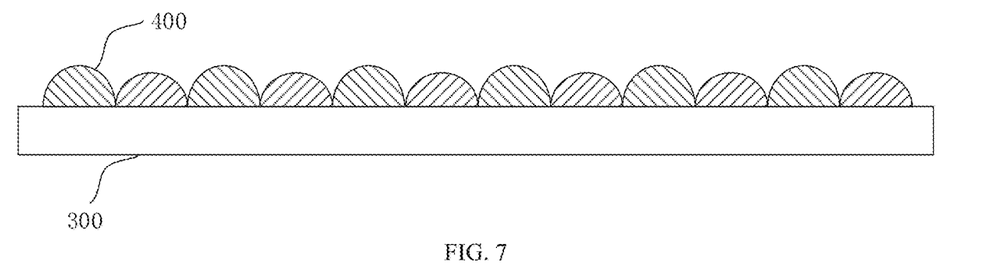
FIG. 7 is a structural diagram of a displaying device according to one embodiment of the disclosure.
Figure 8:
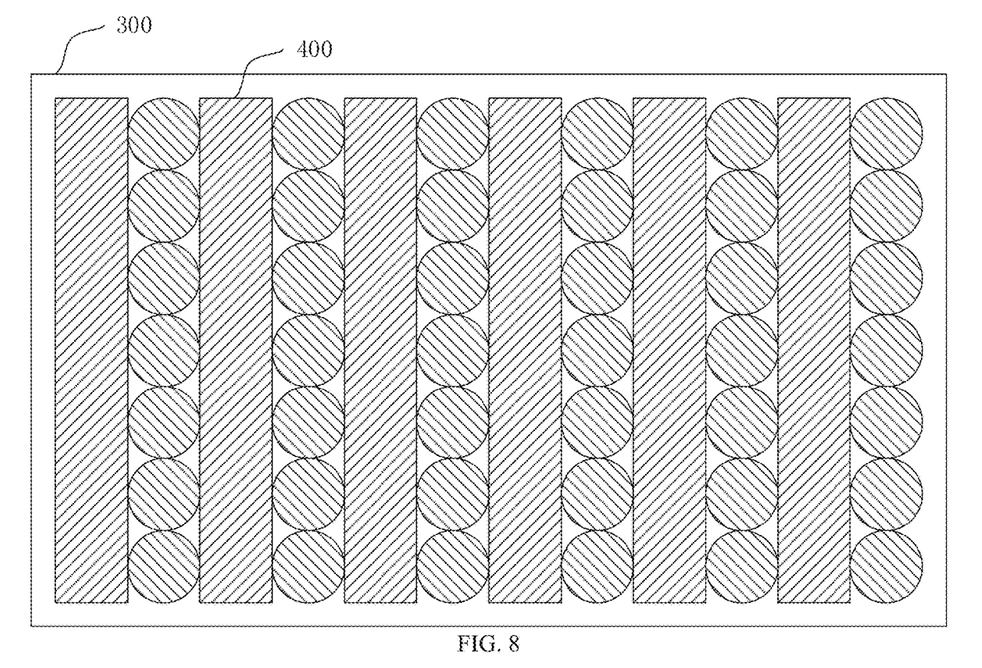
FIG. 8 is a structural diagram of the displaying device shown in FIG. 7 from another perspective.
Figure 9:
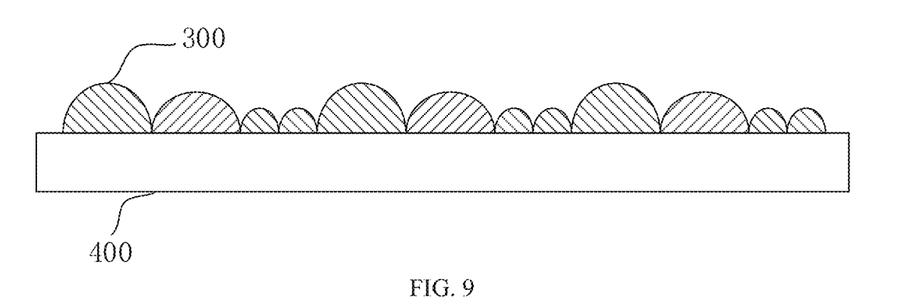
FIG. 9 is a structural diagram of a displaying device according to another embodiment of the disclosure.
Figure 10:
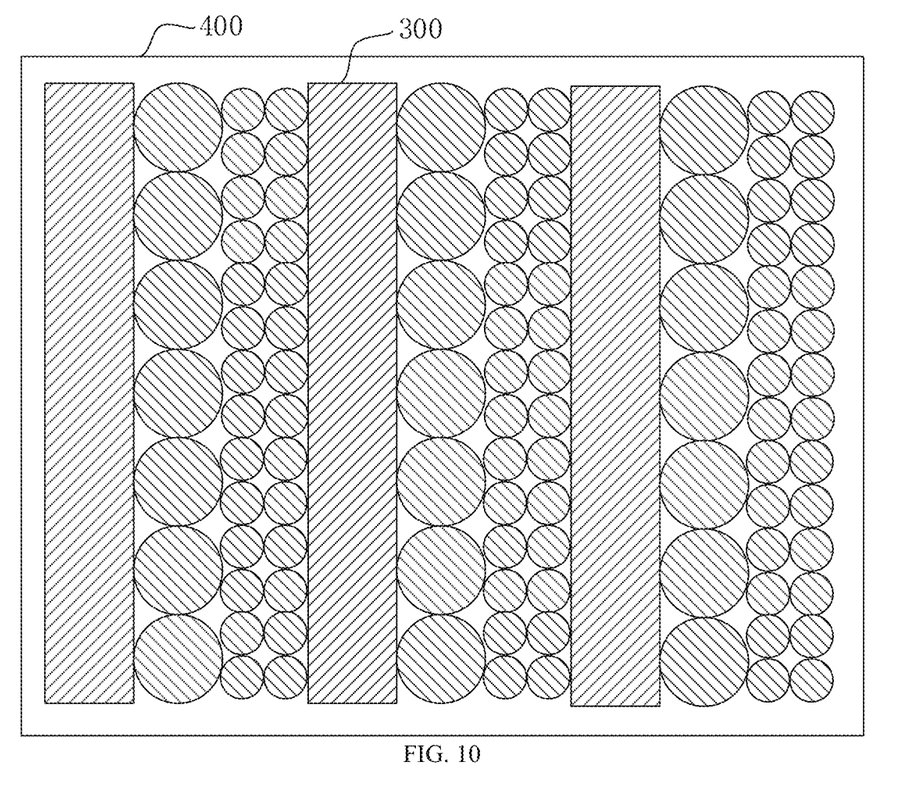
FIG. 10 is a structural diagram of the displaying device shown in FIG. 9 from another perspective.

Please refer to FIG. 7 which is a structural diagram of a displaying device according to one embodiment of the disclosure, FIG. 8 which is a structural diagram of the displaying device shown in FIG. 7 from another perspective, FIG. 9 which is a structural diagram of a displaying device according to another embodiment of the disclosure, and FIG. 10 which is a structural diagram of the displaying device shown in FIG. 9 from another perspective. The displaying device may specifically comprise: an electronic device 300 and any one micro-lens structure 400 mentioned above, wherein the electronic device 300 is connected to the micro-lens structure 400.

In this embodiment, the specific structure and working principle of the micro-lens structure 400 are the same as those of the micro-lens structure in the above embodiments, and will no longer be detailed here.

In the embodiments of the disclosure, the micro-lens structure 400 may comprise micro-lens units distributed in an array, each micro-lens unit may comprise at least two micro-lenses, and the arch heights of the at least two micro-lenses are different, so that the curvature radiuses and focal lengths of the at least two micro-lenses are different, and thus, the micro-lens structure is able to fulfill light field display to realize a naked-eye 3D display effect. In this way, an adjustment of the focal lengths of the micro-lenses by means of the application of different voltages to the micro-lenses is avoided, the power consumption is low, the structure is simple, and the displaying device may be designed to be light and thin; in addition, the interference is low, and the display effect is stable.

In actual application, the micro-lens structure 400 may be directly formed on the electronic device 300, or be bonded on the electronic device 300 with a bonding medium such as glue or adhesive tape, and the embodiments of the disclosure have no specific limitation to the connection manner of the micro-lens structure 400 and the electronic device 300.

In some optional embodiments of the invention, the micro-lens structure 400 may be prepared on the electronic device 300 by lithographic thermal reflux, that is, the micro-lens structure 400 may be directly formed on the electronic device 300, and it will be more advantageous to the light and thin design of the displaying device by integrating the micro-lens structure 400 in the displaying device.

Optionally, the electronic device 300 may comprise at least one of a display component and a sensor, and the embodiments of the disclosure have no limitation to the specific type of the electronic component 300.

Figure 11:
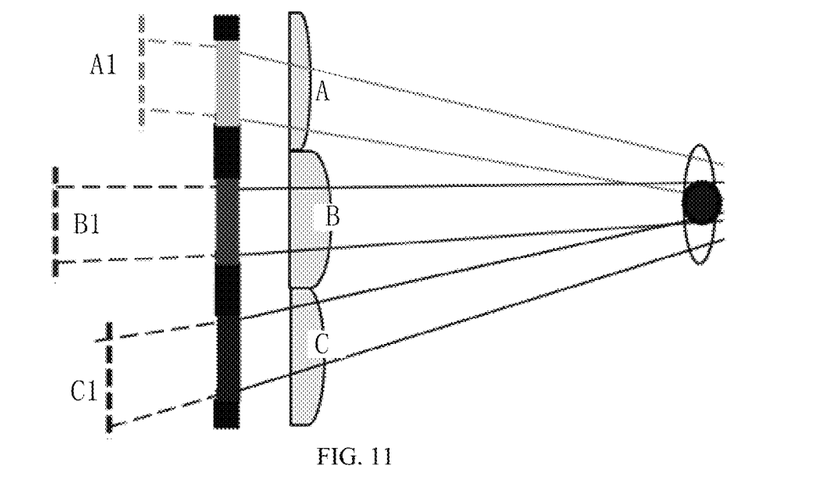
FIG. 11 is a diagram of the working principle of a displaying device according to one embodiment of the disclosure.

Please refer to FIG. 11 which is a diagram of the working principle of a displaying device according to one embodiment of the disclosure. As shown in FIG. 11, the displaying device comprises: an electronic device 300 and a micro-lens structure 400. The micro-lens structure 400 comprises three micro-lenses with different arch heights (micro-lens A, micro-lens B and micro-lens C), so that when sub-pixels on the electronic device 300 pass through the three micro-lenses, three virtual images with different depths of field (virtual image A1, virtual image B1 and virtual image 1) will be formed and seen by human eyes, and a light field display effect is realized.

It should be noted that FIG. 11 only illustrates the case where the micro-lens structure 400 comprises three micro-lenses with different arch heights. In actual application, the micro-lens structure 400 may comprise other numbers of micro-lenses, such as two, four or more, and the embodiments of the disclosure have no limitation in this aspect.

In the embodiments of the disclosure, the micro-lens structure may comprise micro-lens units distributed in an array, each micro-lens unit may comprise at least two micro-lenses, and the arch heights of the at least two micro-lenses are different, so that the curvature radiuses and focal lengths of the at least two micro-lenses are also different, and thus, the micro-lens structure is able to fulfill light field display to realize a naked-eye 3D display effect. In this way, an adjustment of the focal lengths of the micro-lenses by means of the application of different voltages to the micro-lenses is avoided, the power consumption is low, the structure is simple, and the displaying device may be designed to be light and thin; in addition, the interference is low, and the display effect is stable.

Figure 12:
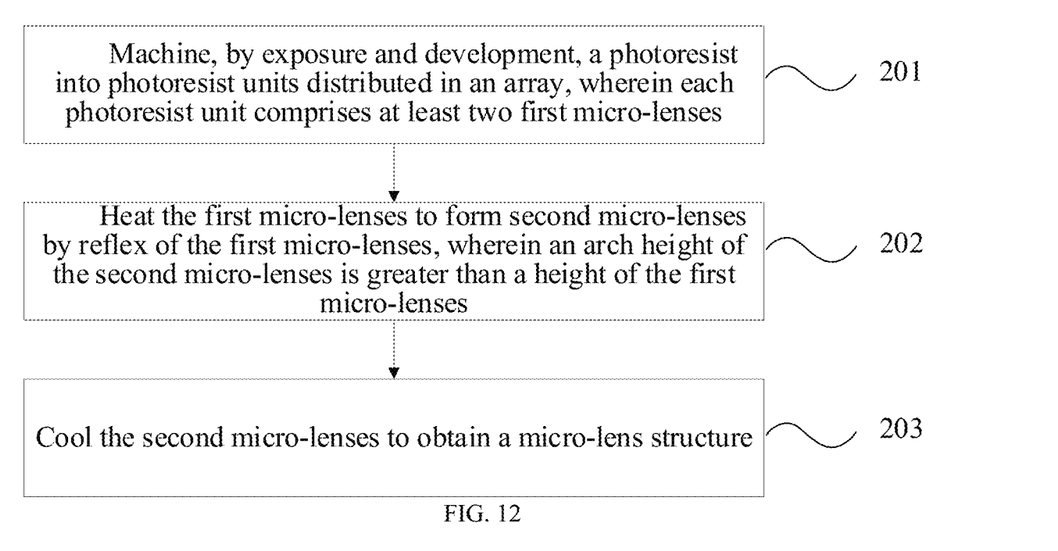
FIG. 12 is a flow diagram of the steps of a machining method of a micro-lens structure according to one embodiment of the disclosure.

Please refer to FIG. 12 which is a flow diagram of the steps of a machining method of a micro-lens structure according to the disclosure. As shown in FIG. 12, the method may specifically comprise:

Step 201: a photoresist is machined into photoresist units distributed in an array by exposure and development, wherein each photoresist unit comprises at least two first micro-lenses.

Figure 13:
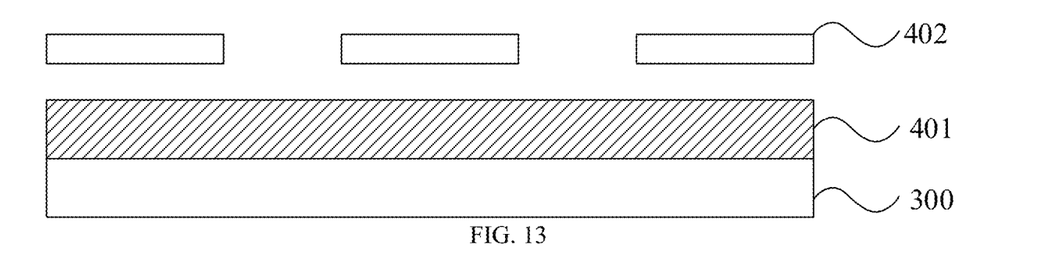
FIG. 13 is a first state diagram of a micro-lens structure in the machining process according to one embodiment of the disclosure.

As shown in FIG. 13, a photoresist is smeared on an electronic device 300 of a displaying device to form a photoresist layer 401, and then the photoresist layer 401 is covered with a dry film 402 to be exposed. Wherein, a preset pattern is disposed on the dry film 402, so that an exposed area and a non-exposed area are formed in the photoresist layer 401.

Figure 14:
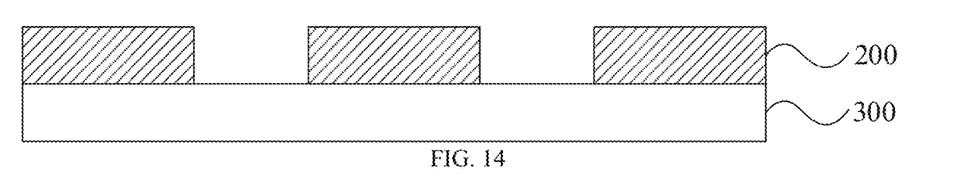
FIG. 14 is a second state diagram of a micro-lens structure in the machining process according to one embodiment of the disclosure.

Then, the exposed area on the photoresist layer 401 is dissolved by development to machine the photoresist layer 401 into the photoresist units distributed in an array, shown in FIG. 14, wherein each photoresist unit comprises at least two first micro-lenses 200, and generally, the at least two first micro-lenses 200 have the same height.

Specifically, the at least two first micro-lenses 200 are first micro-lenses 200 of different shapes and the same width; or, the at least two micro-lenses 200 are first micro-lenses 200 of the same shape and different widths; or, the at least two micro-lenses 200 are first micro-lenses 200 of different shapes and different widths. The embodiments of the disclosure have no limitation in this aspect.

Step 202: the first micro-lenses are heated to form second micro-lenses by reflux, wherein the arch height of the second micro-lenses is greater than that of the first micro-lenses.

Figure 15:
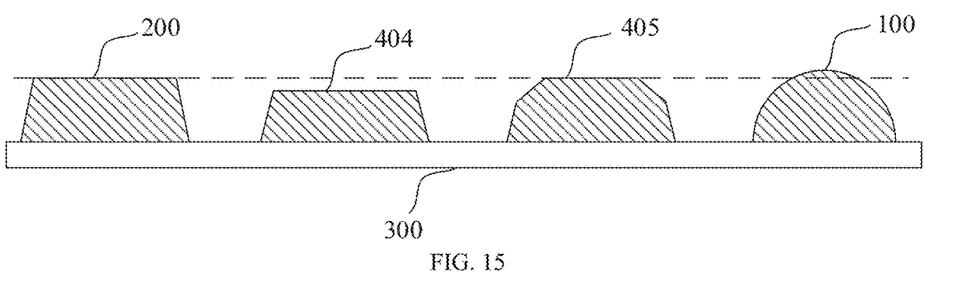
FIG. 15 is a variation diagram of the arch height of a micro-lens structure in the machining process according to the disclosure.

In the embodiments of the disclosure, the first micro-lenses 200 may be heated by thermal reflux. As shown in FIG. 15, before thermal reflux, due to the volatilization of residual solvents in the first micro-lenses 200, the size of the first micro-lenses 200 will be slightly decreased to form the micro-lens structure 404.

Specifically, when thermal reflux starts, the kinetic energy of molecules will be increased, the fluidity will be improved, and the volatilized micro-lens structure 404 will flow back to form the second micro-lenses 405; wherein, with respect to the micro-lens structure 404 obtained after volatilization, the size of the second micro-lenses 405 is not changed, and the arch height of the second micro-lenses 405 is increased. In actual application, the arch height of the second micro-lenses 405 is greater than the height of the first micro-lenses 200.

Step 203: the second micro-lenses 405 are cooled to obtain the micro-lens structure, wherein the micro-lens structure comprises micro-lens units distributed in an array, and each micro-lens unit comprises at least two micro-lenses with different arch heights.

Figure 16:
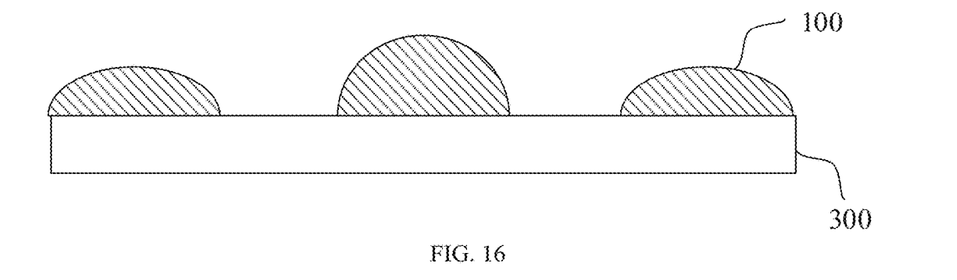
FIG. 16 is a third state diagram of a micro-lens structure in the machining process according to one embodiment of the disclosure.

In the embodiments of the disclosure, the second micro-lenses 405 may be cooled to release the stress in the second micro-lenses 405, and when the stress in the second micro-lenses 405 reaches an equilibrium state, the micro-lens structure shown in FIG. 16 is obtained. Wherein, the micro-lens structure comprises micro-lens units distributed in an array, and each micro-lens unit may comprise at least two micro-lenses 100; wherein, the at least two micro-lenses 100 have different arch heights, and compared with the second micro-lenses 405, the height of the micro-lenses 100 will be further increased.

In the embodiments of the disclosure, the micro-lens structure is able to fulfill light field display to realize a naked-eye 3D display effect. In this way, an adjustment of the focal lengths of the micro-lenses by means of the application of different voltages to the micro-lenses is avoided, the power consumption is low, the structure is simple, and the micro-lens structure may be designed to be light and thin; in addition, the interference is low, and the display effect is table. In addition, the micro-lenses may be prepared on an electronic device of the displaying device by lithographic thermal reflux, and the micro-lens structure may be integrated in the displaying device to realize a light and thin design of the displaying device.

It should be noted that for the sake of a brief description, the embodiments of the method are expressed as a series of action combinations. However, those skilled in the art should appreciate that the embodiments of the disclosure will not be limited by the sequence of the actions, and some steps may be performed in other sequences or synchronously in some other embodiments of the disclosure. In addition, those skilled in the art should also appreciate that the embodiments described in the specification are merely preferred ones, and the actions involved in these preferred embodiments are not definitely indispensible to the embodiments of the disclosure.

The embodiments in the specification are described progressively, the differences from other embodiments are emphatically stated in each embodiment, and the similarities of these embodiments may be cross-referenced.

Although the preferred embodiments of the disclosure have been described, those skilled in the art can make transformations and modifications to these embodiments based on the basic creative concept of the disclosure. So, the appended claims are intended to include the preferred embodiments as well as all transformations and modifications falling within the scope of the embodiments of the disclosure.

Finally, it should be noted that relational terms such as "first" and "second" in this specification are merely used to distinguish one entity or operation from the other one, and do not definitely indicate or imply that these entities or operations have any actual relations or sequences. In addition, the term "comprise" or "include" or other variations are intended to refer to non-exclusive inclusion, so that a process, method, article or terminal device comprising a series of elements not only comprises these elements listed, but also comprises other elements that are not clearly listed, or inherent elements of the process, method, article or terminal device. Unless otherwise clearly specified, an element defined by the expression "comprise a" shall not exclusive of other identical elements in a process, method, article or terminal device comprising said element.

The micro-lens structure, the displaying device, and the machining method of the micro-lens structure provided by the disclosure are introduced in detail above, specific examples are used in this specification to expound the principle and implementation of the disclosure, and the description of the above embodiments is merely used to assist those skilled in the art in understanding the method and core concept thereof of the disclosure. In addition, those ordinarily skilled in the art can make changes to the specific implementation and application scope based on the concept of the disclosure. So, the contents of the specification should not be construed as limitations of the disclosure.

The invention claimed is:

1. A micro-lens structure, comprising: micro-lens units distributed in an array, wherein each said micro-lens unit comprises at least two micro-lenses made of a photoresist; and
   the at least two micro-lenses have different arch heights;
   wherein the micro-lens units are distributed in an array in a first direction; and the at least two micro-lenses in each said micro-lens unit are alternately arranged in the first direction;
   wherein the micro-lenses comprise at least one of a cylindrical micro-lens and a spherical micro-lens, and the micro-lens unit comprises at least one said cylindrical micro-lens and multiple said spherical micro-lenses;
   a lengthwise direction of the cylindrical micro-lens is a second direction that is perpendicular to the first direction; and
   in the second direction, the multiple spherical micro-lenses are sequentially arranged in a spaced manner.

2. The micro-lens structure according to claim 1, wherein the micro-lens unit comprises: one said cylindrical micro-lens and one said spherical micro-lens; and
   in the first direction, a width of the cylindrical micro-lens is equal to that of the spherical micro-lens.

3. The micro-lens structure according to claim 1, wherein the micro-lens unit comprises multiple micro-lenses, and the multiple micro-lenses comprise: at least two said cylindrical micro-lenses and/or at least two said spherical micro-lenses; and
   in the first direction, widths of the at least two cylindrical micro-lenses are different, and widths of the at least two spherical micro-lenses are different.

4. The micro-lens structure according to claim 3, wherein in case where the micro-lens unit comprises multiple said cylindrical micro-lenses or multiple said spherical micro-lenses, widths of the multiple cylindrical micro-lenses are multiples of one another, and widths of the multiple spherical micro-lenses are multiples of one another.

5. The micro-lens structure according to claim 1, further comprising a refractive index matching layer that covers the micro-lenses.

6. The micro-lens structure according to claim 5, wherein the refractive index matching layer is made of resin, and a refractive index of the refractive index matching layer matches a refractive index of the micro-lenses.

7. The micro-lens structure according to claim 6, wherein the refractive index of the refractive index matching layer is greater than the refractive index of the micro-lenses; or
   the refractive index of the refractive index matching layer is smaller than the refractive index of the micro-lenses.

8. The micro-lens structure according to claim 1, wherein the first direction is a lengthwise direction or a widthwise direction of the micro-lens structure.

9. A displaying device, comprising: an electronic device and the micro-lens structure according to claim 1, wherein the micro-lens structure is connected to the electronic device.

10. The displaying device according to claim 9, wherein the micro-lens structure is formed on the electronic device.

11. The displaying device according to claim 10, wherein the electronic device comprises at least one of a display component and a sensor.

12. The displaying device according to claim 9, wherein the first direction is the same as a distribution direction of a pixel array of the displaying device.

13. A machining method of a micro-lens structure, being used for machining the micro-lens structure according to claim 1, and comprising:
   machining, by exposure and development, a photoresist into photoresist units distributed in an array, wherein each said photoresist unit comprises at least two first micro-lenses;
   heating the first micro-lenses to form second micro-lenses by reflux of the first micro-lenses, wherein an arch height of the second micro-lenses is greater than a height of the first micro-lenses; and
   cooling the second micro-lenses to obtain the micro-lens structure.

* * * * *